United States Patent [19]
Norman

[11] Patent Number: 4,787,108
[45] Date of Patent: Nov. 29, 1988

[54] NEST FOR AND METHOD OF MANAGING MEGACHILE ROTUNDATA

[76] Inventor: Frederick A. Norman, 21 Greensview Road, Banksia Park, Australia

[21] Appl. No.: 36,946
[22] Filed: Apr. 10, 1987
[51] Int. Cl.⁴ .............................................. A01K 47/00
[52] U.S. Cl. ........................................ 449/1; 449/4
[58] Field of Search ........................................ 6/1, 11

[56] References Cited

U.S. PATENT DOCUMENTS

| | | | |
|---|---|---|---|
| 3,936,894 | 2/1976 | Barber | 6/11 |
| 4,365,372 | 12/1982 | Norman | 6/1 |
| 4,491,994 | 1/1985 | Youssef | 6/1 |

Primary Examiner—Robert P. Swiatek
Attorney, Agent, or Firm—Millen & White

[57] ABSTRACT

A nest for Megachile Rotundata bees describes a group of blind tunnels specifically designed to present bees with a near as possible natural tunnel to suit their instinctive nesting habit. The nest as described hereinbefore along with details of husbandry and managements of Megachile Rotundata bees is designed as a single use unit which simplifies protection and collection of young by simple means of fumigation and sterilization against disease possible present on retrievable progeny. The nest described herein has characteristics which will permit control of fungus, mould and infestation by predators, but still be durable for the period of activity of laying down of young by adults during pollination and breeding period. Costs incurred by seed growers, and owner of Megachile Rotundata bees will be considerably reduced by use of the herein described nest in conjunction with comparison to present practices now followed by labor and equipment intensiveness.

11 Claims, 2 Drawing Sheets 4,787,108

NEST FOR AND METHOD OF MANAGING MEGACHILE ROTUNDATA

BACKGROUND OF THE INVENTION

This invention relates to improvements and refinements in nests used for trapping, domestication, husbandry and management of "Megachile Rotundata", commonly known as leaf cutter bees by persons involved in growing Lucerne "Alf Alfa" and like Leguminosae pasture for seed, and by other practicing pollination services using such bees, or the like, as pollinators.

It is an established fact that seed set is considerably increased in the aforesaid crops by the introduction of Megachile Rotundata bees for pollination when such crops are at a suitable blooming stage. In addition, these bees are able to increase their numbers from generation to generation.

Leaf cutter bees generally are solitary bees, but Megachile Rotundata are known to be gregarious and are not averse to living amongst their own kind with each female mating only once. She alone constructs cigar-like shaped cells inside blind tunnels, or preexisting holes of a suitable bore within which the ova for procreation are deposited. In this description, Megachile Rotundata, for simplicity, will be referred to as leaf cutter bees.

Research also indicates that by providing artificial or manmade tunnels, leaf cutter bees can be kept within a selected area to both pollinate and regenerate their kind during which activity one cell, including the depositing of ova, is completed at least once per day, inside the blind tunnels commencing at the furthest point from the opening and progressing along in sequence to the front of said tunnels, such cells being oriented end-to-end in a horizontal plain.

In order to recover the progeny and permit increasing bee numbers, it is necessary to retrieve from such tunnels each and every live cell, as well as to protect the livestock from infestation by pathogens and attack by pests and predators during nesting and during the active adult life cycle, which averages six weeks per adult.

Leaf cutter bees are entirely different bio-logically, physically and actively from the familiar honey bees which originate from a single fertilized queen whose progeny swarm and live in a hive, manufacturing from their own glands wax and honey from which they sustain their own kind and from which both products are recovered by the owner of such hive or hives.

Honey bees, "*Apis mellifera*", are equipped with substantial stingers and at times tend to aggressiveness, but the leaf cutter bee has no effective stingers and therefore no defense against predators or pests. They do not produce honey or wax.

The purpose of this invention is to provide a suitable number of tunnels within the minimum possible space. Since the discovery of man's ability to trap and domesticate along with managing this bee, a wide variety of artificial forms of nesting tunnels have been conceived. Approaches include: drilled wooden blocks with backing sheets, grooved boards which have been either bolted or clamped together to form blind tunnels, extruded tunnels in polystyrene-type materials, and also like materials with half-circle grooves again clamped together.

All of the aforesaid materials present problems for retrieval of the progeny. In addition, there is the problem of the considerable area required to provide, say five thousand, tunnels from solid materials. All of the heretofore approaches were costly to produce and supply to owners of bees.

In addition to the high cost and the design problems of tunnels, users were and are currently compelled to remove and recover the young manually or by additional machinery or equipment, and thence attempt to sterilize such nest materials to prevent residual pathogens from infesting next generation bees.

It has been proven from research and practice that such action is costly and inherently ineffective.

A completely waxed paper conglomerate of blind tunnels was developed in 1979, which development is the subject of Australian Patent No. 541,427, the named Inventor in which is Frederick Arthur Norman. It has been found and ascertained from further research that the nest is not effective and presents added restriction on recovery of the young as well as generating high temperatures in the solid materials because of the inability of air to reach and circulate around cells contained in the tunnels. This is the case because waxed tunnels do not permit natural moisture in leaf-clipping-formed cells to be absorbed by the tunnel material.

SUMMARY OF THE INVENTION

It is a purpose of this invention and an improvement to earlier known leaf cutter bees' nests to provide a light, effective, low cost group of blind tunnels which comprise say five thousand such tunnels parallel with one another, concentrated in the least possible area, with an acceptable internal diameter to suit the biology of the bee and its activities within said tunnel whilst building cells from leaf clippings therein.

BRIEF DESCRIPTION OF THE DRAWINGS

Embodiments of the nest are described in relation to the accompanying drawings from which it will be seen that all requirements are met which are necessary to protect leaf cutter bee cells within a structure, or conglomerate, of tunnels conforming as closely as possible to the natural habitat of the bees in a feral or wild state.

DETAILED DESCRIPTION

It has been established from research that greater control of bee morality along with improved health of livestock can be attained by practicing loose-cell storage during the diapause period and that the destruction by burning of all previously used nesting materials destroys any pathogens or fungi which may have been present at collection of young.

Figure 2:
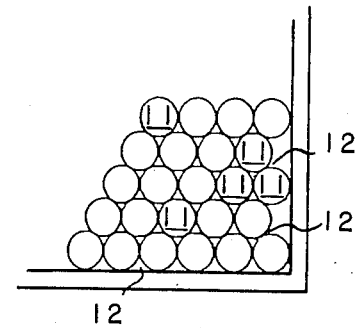
FIG. 2 is a front view of tunnels in the nest.

It has also been established from research that in order to reduce compost action by leaf clippings forming the cells, it is essential for as much air as is possible to circulate around blind tunnels 11 in a nest 10 with a material used being able to absorb air and dissipate moisture rapidly. Hence the structure or collection of tunnels 11 in situ FIG. 2 with spaces 12 between the tunnels is used.

Figure 4:
FIG. 4 is a view of a bee within a tunnel building a cell.

Recent tests by the inventor have indicated that the tunnels 11 should be configured as paper tubes of a preferred paper material with an inside bore 13 to suit a nesting bee. This arrangement provides the required rate of moisture absorption and heat dissipation from leaf clippings over a given period during nesting activities of leaf cutter bees as depicted in FIG. 4.

Figure 1:
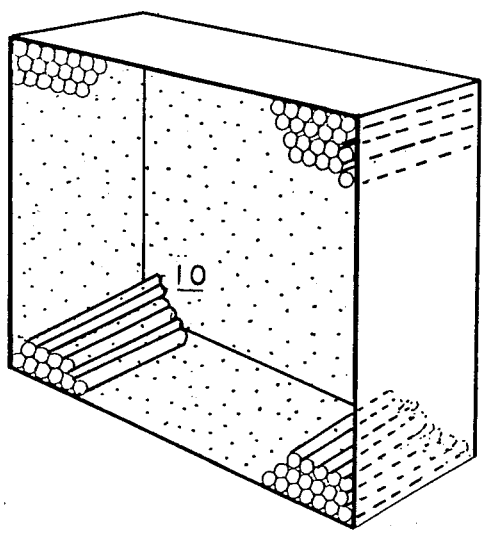
FIG. 1 is a perspective view of the nest.

The aforesaid paper tubes 11 also have ideal ambient thermal properties when grouped within a given space. In accordance with a suggested embodiment, five thousand tubes are mounted in an area of 270 square centimeters contained within a corrugated packing board tray which has a base with four sides upstanding in a manner to constrain all tunnels within the perimeter. In order to permit release of the tubes, such fixing is designed to allow access to the base of the tray after the tunnels have been used and filled with cells of leaf cutter bees, as is correlated to FIGS. 1 and 3.

When laying down their progeny, leaf cutter bees need protection from pests and predators. All facets of the nest herein described can be physically protected, except the front opening giving access to the bees which, however, can be readily viewed by the owner. The activity of bees discourages entry from that area. Thus it will be seen that the rear and sides of said nests are vulnerable to intrusion by predators and pests. Hence it becomes essential to present an impregnable barrier (14 FIG. 8) to such end of the tubes forming the blind tunnels to discourage predators which seek to consume the laid contents of the cells within the tunnels 11.

Figure 3:
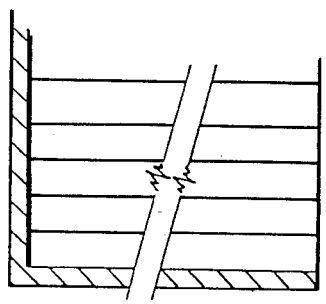
FIG. 3 is a view of tunnels formed by adherence to the rear of a box in axis parallel.
Figure 8:
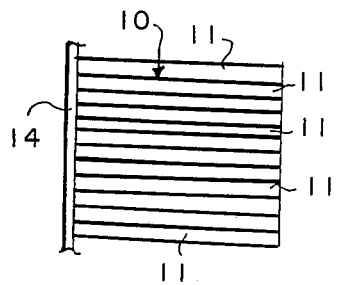
FIG. 8 is a side view of a portion of the nest showing the tubes adhered to a rear wall of the nest.

The aforesaid barrier can be achieved by affixing the tubes 11 to the rear wall of nest 10, as is shown in FIG. 8, by applying a suitable adhesive which will then retain the tubes, now blind tunnels, and which when set has a glass-like surface and is completely insoluble when wet and/or immersed in water or such like liquid. FIG. 3 indicates the use of such material. The sides of the nest gain protection by being suitably sited within a preferred area in the field.

Figure 5A:
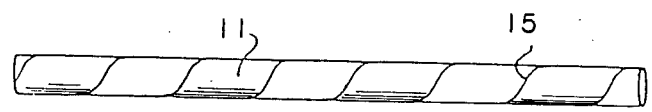
FIG. 5A is a side view of a first type of tunnel with a spiral seam prior to unraveling.
Figure 5B:
FIG. 5B is a side view of the first type of tunnel showing the tunnel unraveling.
Figure 6A:
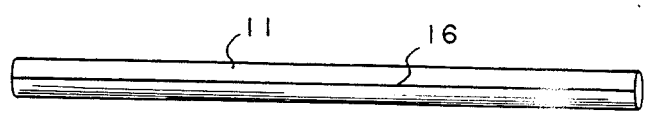
FIG. 6A is a side view of a second type of tunnel with a longitudinal seam shown before unraveling.
Figure 6B:
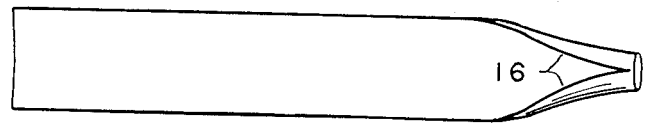
FIG. 6B is a side view of the second type of tunnel after unraveling.

Referring now to FIGS. 5 and 6, the tubes or tunnels 11 can be made in several ways. One method is by extrusion crimping and sealing the edges of a strip of paper with an adhesive which is water-soluble. Such an extrusion should be made from a particular weight of paper. A further method of manufacture is to spirally laminate another particular weight of paper to give an identical weight of paper to that which is extruded. The spirally laminated paper is again sealed using an adhesive of quick-drying capacity, but highly water-soluble. In FIG. 5A, a closed spiral seam 15 is shown before soaking. During soaking of the nest 10, the seam 15 opens up as is shown in FIG. 5B. FIG. 6A shows a tube 11 with a closed straight seam 16. Upon soaking the nest 10, the straight seam 16 opens, as is shown in FIG. 6B.

The production of the aforesaid materials into nests for use in pollination of crop, regeneration and retrieval of progeny is achieved by using suitably devised packing methods to secure tubes 11 firmly within the bounds of the tray base when the upstanding sides are locked in position.

Figure 7:
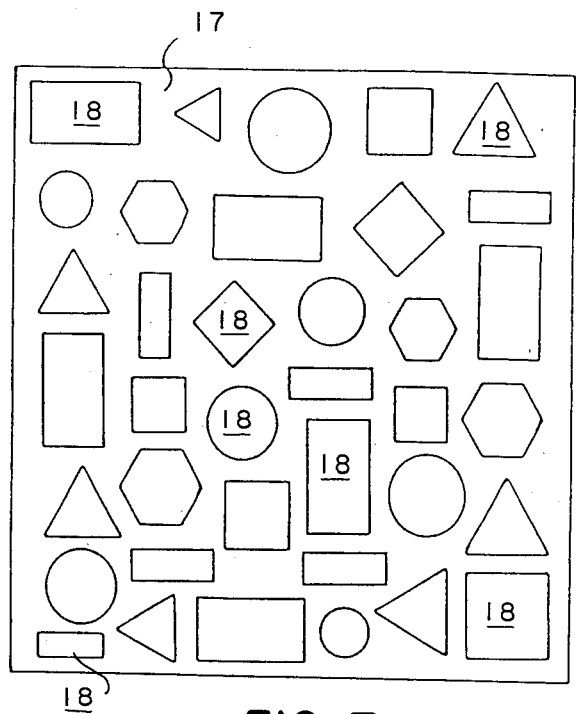
FIG. 7 is a view of various identification patterns.

When placing the aforesaid within suitable or preferred shelter in the field or area to be pollinated, it is advantageous and of assistance to bees, which it has been established can recognize colors and geometric forms, to have such forms and recognized colors stencilled over the face of the nests 10. This aids bees in orienting themselves to their selected tunnels on return to the nest. A typical stencil 17 with geometric patterns 18 is shown in FIG. 7.

It will therefore be seen from the foregoing that a light, durable nest 10, when suitably sited in accord with management techniques now being practiced, can be made available at low cost to bee owners and operators. The following method of collection and fumigation or sterilization from disease, simultaneously, presents immense cost savings and advantages.

To collect or harvest the progeny contained within blind tunnels, the nest or nests are removed from shelters or protection in the field and are taken to a preferred site at which a suitable container of water, to which is added a selected fumigant or sterilizing agent, is provided.

The owner or operator of bees and nests merely releases a lock on each corner of the upstanding sides of the nest 10, lowers the nest while oriented in a level plane, and, with the back uppermost, immerses the nest face down in the water which then permits the adhesive holding the tubes in circular form to release. The blind end 14 of the nest 10 is affixed to the back of the tray. The tunnels 11 will then unravel and release progeny contained therein which progeny float on the water. Any pests, predators or cadavers will sink or drown. FIGS. 5B and 6B both depict conditions of tunnels after immersion.

All live cells can then be collected, dried and stored in suitable containers within a cool storage area for hibernation, whilst the residual nesting material is placed aside to dry, ready for burning.

While it will be seen that considerable detail and description of the nests along with husbandry practices is described herein, it is to be realized variations can be made in materials used and methods of assembly, and these variations are intended to be considered within the scope of the present invention.

What is claimed is:

1. A method of managing Megachile Rotundata, the method comprising steps of:
    configuring a nest of a plurality of paper tubes arranged in an array of blind tunnels, wherein each tunnel is readily openable upon being soaked in water, each tunnel providing a cell in which the progeny of the Megachile Rotundata are contained;
    harvesting the progeny by soaking the nest in a bath of water to open the individual cells so as to release the progeny therefrom so as to float on the surface of the bath wherein the progeny can be collected for subsequent nesting; and
    destroying the nest to destroy any disease existing therein.

2. The method of claim 1 wherein the bath includes a sterilizing agent to bathe the progeny released therein to thereby minimize the spread of disease from one generation of Megachile Rotundata to the next.

3. The method of claim 1 wherein in configuring the nest the tubes are secured at one end to a panel to close the back ends of the tunnels and prevent access thereto by insect pests during the nesting cycle.

4. The method of claim 3 wherein the tubes are each configured as cylinders having a seam wherein when the tubes are soaked the seams separate, opening the tubes and releasing the progeny.

5. The method of claim 1 wherein in configuring the nest, means are provided for indicating to individual Megachile Rotundata the location of their individual tubes.

6. A nest for Megachile Rotundata, the nest comprising:

a plurality of tubes for containing progeny of Megachile Rotundata, the tubes having seams joined by a soluble adhesive which can be dissolved in a suitable liquid not toxic to the progeny, wherein when the tubes are immersed in the liquid, the tubes open up releasing the progeny for harvesting and subsequent deployment for pollination of crops, and means for releasably retaining the plurality of tubes in a nest configuration while the Megachile Rotundata are nesting, said retaining means being capable of releasing the tubes from the nest configuration so that individual tubes separate in the liquid.

7. The nest of claim 6 wherein the tubes are made of paper and wherein the adhesive is a water-soluble adhesive which releases the seam when the tubes are soaked in water, water being the suitable liquid and being a liquid upon which the progeny floats for collection.

8. The nest of claim 7 wherein the means for retaining the plurality of tubes is an enclosure having a back and side means, wherein the tubes each have a rear end, which rear end is adhered to the back of the retaining means while the side means supports the tubes laterally with the axes thereof extending parallel to one another, the side means being removable prior to immersing the nest in water so as to allow the tubes to unravel.

9. The nest of claim 8 wherein the tubes are made of a single strip of paper having substantially parallel edges which are joined by rolling the strip to juxtapose the edges, which edges are retained in juxtaposition by the water-soluble adhesive 10. The nest of claim 8 wherein the tubes are each made of at least one strip of paper having a pair of parallel edges which are juxtaposed in a helical seam when the paper is rolled to form one of the tubes, the seams being retained in juxtaposition by the water-soluble adhesive.

11. The nest of claim 8 wherein visual means are provided on the nest for indicating to the Megachile Rotundata the location of their individual tubes.

* * * * *